United States Patent
Leroux et al.

(10) Patent No.: US 10,745,536 B2
(45) Date of Patent: Aug. 18, 2020

(54) ORGANO-MODIFIED LAYERED DOUBLE HYDROXIDES AND COMPOSITE POLYMER MATERIALS COMPRISING SAME

(71) Applicants: CENTRE NATIONAL DE LA RECHERCHE SCIENTIFIQUE, Paris (FR); UNIVERSITÉ CLERMONT AUVERGNE, Clermont, Ferrand (FR); ALMA MATER STUDIORUM—UNIVERSITA DI BOLOGNA, Bologne (IT); ECOLE NATIONALE SUPÉRIEURE DE CHIMIE DE CLERMONT FERRAND, Aubiere (FR)

(72) Inventors: Fabrice Leroux, Aubiere (FR); Vincent Verney, Aubiere (FR); Laura Sisti, Bologne (IT); Annamaria Celli, Bologne (IT); Grazia Totaro, Bologne (IT)

(73) Assignees: CENTRE NATIONAL DE LA RECHERCHE SCIENTIFIQUE, Paris (FR); UNIVERSITÉBLAISE PASCAL- CLERMONT II, Clermont Ferrard (FR); ALMA MATER STUDIORUM- UNIVERSITA DI BOLOGNA, Bologne (IT); ECOLE NATIONALE SUPÉRIEURE DE CHIMIE DE CLERMONT FERRAND, Aubiere (FR)

( * ) Notice: Subject to any disclaimer, the term of this patent is extended or adjusted under 35 U.S.C. 154(b) by 155 days.

(21) Appl. No.: 15/576,459

(22) PCT Filed: May 19, 2016

(86) PCT No.: PCT/FR2016/051189
§ 371 (c)(1),
(2) Date: Nov. 22, 2017

(87) PCT Pub. No.: WO2016/189228
PCT Pub. Date: Dec. 1, 2016

(65) Prior Publication Data
US 2018/0208739 A1    Jul. 26, 2018

(30) Foreign Application Priority Data

May 22, 2015   (FR) .................................. 15 54649

(51) Int. Cl.
*C08K 3/22*          (2006.01)
*C09C 1/00*          (2006.01)
(Continued)

(52) U.S. Cl.
CPC .............. *C08K 3/22* (2013.01); *C01B 13/363* (2013.01); *C01F 1/00* (2013.01); *C01F 7/002* (2013.01);
(Continued)

(58) Field of Classification Search
CPC ........ C08K 3/22; C08K 5/134; C01B 13/363; C09C 1/00; C09C 1/407; C01F 7/002;
(Continued)

(56) References Cited

U.S. PATENT DOCUMENTS

2004/0059037 A1    3/2004   Wang et al.

FOREIGN PATENT DOCUMENTS

WO         2011/064151 A1    6/2011

OTHER PUBLICATIONS

Aug. 10, 2016 Search Report issued in International Patent Application No. PCT/FR2016/051189.
(Continued)

*Primary Examiner* — John E Uselding
(74) *Attorney, Agent, or Firm* — Oliff PLC

(57) ABSTRACT

Layered double hydroxides organo-modified by 3-(4-hydroxyphenyl)propionic acid (HPPA), by 2-(4-hydroxyphe-
(Continued)

Figure 1:
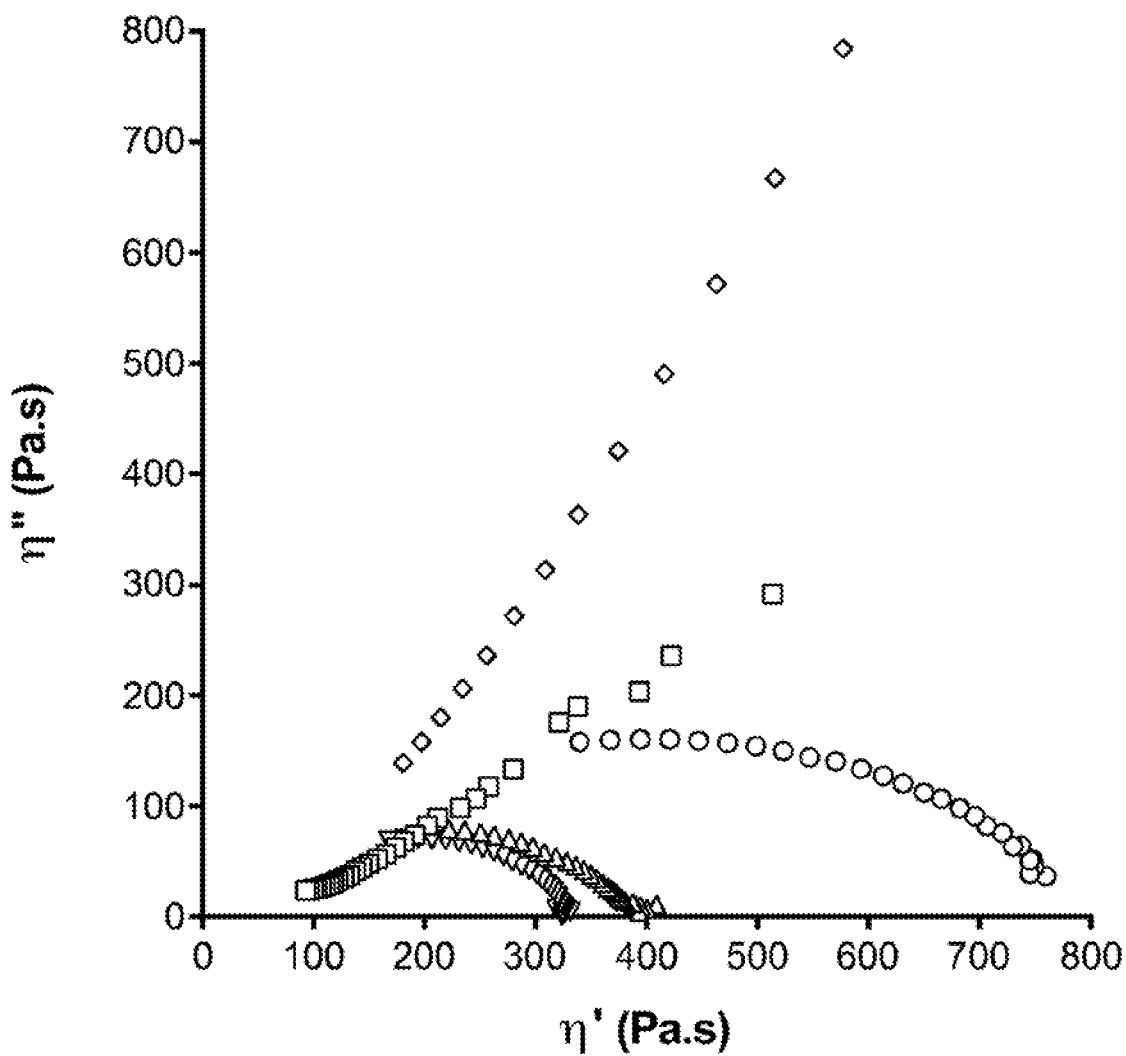

nyl)ethylsulfonic acid or by a hydroxyphenylpropenoic acid, and to composite polymer materials having same. The composite materials are advantageously made of biosourced polymers such as poly(butylene succinate). These composite materials have improved properties over the polymers that make up the composition thereof, and over the composites of the prior art.

13 Claims, 11 Drawing Sheets

(51) Int. Cl.
```
C01F 7/00      (2006.01)
C01B 13/36     (2006.01)
C01G 9/00      (2006.01)
C09C 1/40      (2006.01)
C01F 1/00      (2006.01)
C01F 7/02      (2006.01)
C08K 5/134     (2006.01)
C08L 35/00     (2006.01)
C08L 67/00     (2006.01)
```
(52) U.S. Cl.
CPC .............. *C01F 7/021* (2013.01); *C01G 9/006* (2013.01); *C08K 5/134* (2013.01); *C08L 35/00* (2013.01); *C08L 67/00* (2013.01); *C09C 1/00* (2013.01); *C09C 1/407* (2013.01); *C01P 2002/08* (2013.01); *C01P 2002/22* (2013.01); *C01P 2004/24* (2013.01); *C01P 2006/22* (2013.01); *C08K 2003/2203* (2013.01); *C08K 2003/2227* (2013.01)

(58) Field of Classification Search
CPC . C01F 1/00; C01G 9/006; C08L 35/00; C08L 67/00
See application file for complete search history.

(56) References Cited

OTHER PUBLICATIONS

Ahmad et al; "Synthesis and Characterization of Layered-Double Hydroxide 3-(4-Hydroxyphenyl) Propionate Nanocomposiute;" Nano Hybrids; 2014; vol. 7; No. 18; pp. 53-67.

Sisti et al; "Poly(butylene succinate)/Layered Double Hydroxide Bionanocomposites: Relationships between Chemical Structure of LDH Anion, Delamination Strategy, and Final Properties;" Journal of Applied Polymer Science; 2013; pp. 1931-1940.

Iyi et al; "Water-Swellable MgAl-LDH (Layered Double Hydroxide) Hybrids: Synthesis, Characterization, and Film Preparation;" Langmuir; 2008; vol. 24; pp. 5591-5598.

Gudovan et al; "Functionalized Magnetic Nanoparticles for Biomedical Applications;" Current Pharmaceutical Design; 2015; vol. 21; pp. 6038-6054.

Hennous, Mohammed et al., "Lignosulfonate interleaved layered double hydroxide: A novel green organoclay for bio-related polymer;" Applied Clay Science 71, 42-48, 2013.

Coehlo, Christian et al., "Inorganic-Organic Hybrid Materials Based on Amino Acid Modified Hydrotalcites Used as UV-Absorber Fillers for Polybutylene Succinate;" Eur. J. Inorg. chem., 32, 5252-5258, 2012.

Vassiliou, Alexandros A. et al., "Effect of Evolved Interactions in Poly(butylene succinate)/Fumed Silica Biodegradable In Situ Prepared Nanocomposites on Molecular Weight, Material Properties, and Biodegradability;" Journal of Applied Polym. Sci., 119, 2013, 2010-2024.

Aug. 10, 2016 Written Opinion issued in International Patent Application No. PCT/FR2016/051189.

Leroux Fabrice et al., "X-ray diffraction and rheology cross-study of polymer chain penetrating surfactant tethered layered double hydroxide resulting into intermixed structure with polypropylene, poly(butylene)succinate and poly (dimethyl)siloxane;" Applied Clay Science 100, 102-111, 2014.

ORGANO-MODIFIED LAYERED DOUBLE HYDROXIDES AND COMPOSITE POLYMER MATERIALS COMPRISING SAME

The present invention relates to organo-modified layered double hydroxides, as well as composite polymer materials comprising same. The invention relates in particular to composite materials based on biosourced polymers such as poly(butylene succinate) and layered double hydroxides that are organo-modified in particular with 3-(4-hydroxyphenyl) propionic acid (HPPA). These composite materials have improved properties relative to the polymers included in their composition, and relative to the composites of the prior art.

PRIOR ART

The use of partly or entirely biosourced polymers in place of polymers derived from fossil fuels is a choice that is increasingly obvious in numerous applications, owing to the development of environmental standards, and their increasingly restrictive nature. Unfortunately, the intrinsic properties of the biosourced polymers very often do not allow them to replace the existing polymers. One of the major obstacles to the use of partially or entirely biosourced polymers is their lack of thermal stability, their instability against hydrolysis, their excessive permeability to water, and often their low molecular weight.

The aliphatic polyesters are a promising class of environmentally friendly plastics. Among these materials, poly (butylene succinate), also designated PBS, has some interesting characteristics. It is synthesized from succinic acid and butanediol, both of which can be obtained from renewable materials. Furthermore, PBS is a semicrystalline thermoplastic that is biodegradable and possesses a level of chemical and thermal resistance that makes it potentially usable in numerous applications. Described in the literature as a polymer with great potential, poly(butylene succinate) has inadequate thermal stability and rapid hydrolysis kinetics. Unmodified PBS has an inadequate melt viscosity and cannot be processed by the conventional methods for processing plastics, such as extrusion and blow molding, for example. It is also characterized by poor gas barrier properties.

Other potentially biosourced polymers such as polypropylene succinate have inadequate mechanical properties for interesting applications to be envisaged.

Enhancement of the properties of heat resistance and resistance to hydrolysis of polymers, notably of PBS, by using organic molecules that perform the role of chain extender, is known from the prior art. However, these organic molecules are quite often toxic, for example pyridine dimethanol, a known chain extender for polyurethane. Moreover, the molecules that are not used in the chain extension process may migrate owing to their mobility, leading to a cascade of various problems: concentration gradient through mobility that may lead to an increase of permeability within the polymer, salting out of molecules at the surface, which may lead to an environmental problem and therefore overdosing during manufacture. The use of a "hybrid" extender according to the invention makes it possible to overcome all of these drawbacks.

PBS/inorganic filler composite materials, based on silica, titanium, carbon nanotubes, and graphene, that have improved properties relative to the polymers from which they are derived, are known from the prior art. There are numerous publications that describe polymer nanocomposites derived from layered phyllosilicates. Such polymers have improved resistance to hydrolysis. The article by Vassiliou, A. A. et al., J. Applied Polym. Sci., 119, 2013, 1931-1939, describes the action of fumed silica as a chain extender of PBS. In larger amounts, it is also stated that the presence of fumed silica leads to the formation of cross-linked networks of PBS.

Other documents describe compounds of the hydrotalcite type, also known as layered double hydroxides (designated LDH), or anionic clays, and the use thereof for modifying the properties of certain polymers. [Inorganic-Organic Hybrid Materials Based on Amino Acid Modified Hydrotalcites Used as UV-Absorber Fillers for Polybutylene Succinate. C. Coehlo, T. Stimpfling, V. Verney, F. Leroux, Eur. J. Inorg. Chem., 32, 5252-5258, 2012]; [X-ray diffraction and rheology cross-study of polymer chain penetrating surfactant tethered layered double hydroxide resulting into intermixed structure with polypropylene, poly(butylene)succinate and poly(dimethyl)siloxane. Fabrice Leroux, Antoine Dalod, Mohammed Hennous, Laura Sisti, Grazia Totaro, Annamaria Celli, Christian Coehlo, Vincent Verney. Applied Clay Science, 100, 102-111, 2014]; [Lignosulfonate interleaved layered double hydroxide: a novel green organoclay for bio-related polymer. Mohammed Hennous, Zoubir Derriche, Edwige Privas, Patrick Navard, Vincent Verney and Fabrice Leroux, Applied Clay Science, 71, 42-48, 2013] [Poly(butylene succinate)/Layered Double Hydroxide Bio-Nanocomposites: Relationships between Chemical Structure of LDH Anion, Delamination Strategy and Final Properties. Laura Sisti, Grazia Totaro, Maurizio Fiorini, Annamaria Celli, Christian Coehlo, Mohammed Hennous, Vincent Verney, Fabrice Leroux J. Applied Polym. Sci. 130, 1931-1940, 2013] describe PBS/layered double hydroxide nanocomposite materials of this kind. Some of these materials are based on a layered double hydroxide, organo-modified with a molecule of the hydroxycarboxylic acid type, such as citric acid, ricinoleic acid, and tyrosine. LDHs modified with tyrosine or tryptophan have improved properties of UV resistance, and improve the degradation resistance of the polymer chains in which they are incorporated.

However, the properties of the nanocomposites that are described in these documents are not adequate, especially the mechanical properties, to allow them to be used for replacing the polymers derived from materials of fossil origin. In certain cases of modification with mineral fillers, when PBS is crosslinked in the form of gel, it cannot be extruded, or requires excessive shearing to allow it to be extruded in good conditions.

Layered double hydroxide (LDH) materials organo-modified with 3-(4-hydroxyphenyl)propionic acid (HPPA) for controlled release of herbicides in agriculture are known from the prior art. The purpose of the layered double hydroxide material is to release the organic molecules, and not to fix them. [Synthesis and Characterization of Layered-Double Hydroxide 3-(4-Hydroxyphenyl) Propionate Nanocomposite. A. Siti Nurasikin, H. Norhayati, N. H. Yusri, I. MD Isa, A. Kamari, A. Mohamed, M. I. Mohd Damanhuri. Nano Hybrids, 7, 53-67, 2014].

The aim of the invention was to improve the properties, in particular the mechanical properties, of biodegradable polymers, potentially biosourced, by increasing their molecular weight, their barrier properties and their thermal stability without any chemical modification of their molecular backbone and so not requiring a step of restrictive chemistry. Furthermore, the aim was to employ materials that are biosourced or can be obtained from biosourced materials. Another aim of the invention was to obtain materials whose degradation has little environmental impact.

SUMMARY OF THE INVENTION

The invention is based on the choice of a particular compound, 3-(4-hydroxyphenyl)propionic acid (CAS 501-97-3) employed in the formation of an organo-modified LDH material. The LDH materials organo-modified with 3-(4-hydroxyphenyl)propionic acid (HPPA) have the advantage that they lead to the formation of composite polymers with remarkable mechanical properties, notably in comparison with the composite polymers derived from LDHs organo-modified with other organic molecules, in particular with other hydroxy acids. These remarkable mechanical properties are manifested as soon as very small amounts of organo-modified LDH with 3-(4-hydroxyphenyl)propionic acid are incorporated.

Moreover, 3-(4-hydroxyphenyl)propionic acid is a molecule that can be biosourced, that can be obtained by enzymatic synthesis and whose presence in the composite polymers does not increase the environmental impact during degradation of the latter.

According to one variant of the invention, 2-(4-hydroxyphenyl)ethylsulfonic acid, or a 3-(hydroxyphenyl)propenoic acid, can be used in place of 3-(4-hydroxyphenyl)propionic acid.

The invention relates to an organo-modified layered double hydroxide material corresponding to formula (I):

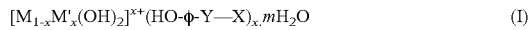

in which:
X represents a group selected from: —COO⁻ and —SO₃,
Y represents a group selected from: —CH₂—CH₂— and —CH═CH—,
φ represents a phenyl group substituted in the ortho, meta or para position, on the one hand with the hydroxyl group, and on the other hand with the group —Y—X,
m represents a number in the range from 0 to 2,
and
either:
  M represents one or more cations selected from: Mg, Zn, Co, Ni, Ca, Cu,
  M' represents one or more cations selected from: Al, Ga, Fe, Cr, and
  x represents a number, 0<x<1, preferably 0.1≤x≤0.5
or
  M represents Li, M' represents Al, and x=2/3.

The invention also relates to a composite material comprising at least one polymer matrix based on poly(butylene succinate) and/or poly(propylene succinate) and at least one organo-modified layered double hydroxide material corresponding to formula (I).

The invention further relates to a first method for manufacturing the composite material, comprising:
supplying an organo-modified layered double hydroxide material corresponding to formula (I):

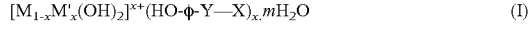

supplying the polymer matrix,
mixing the material of formula (I) and the polymer matrix at a temperature greater than or equal to the melting point of the polymer matrix,
extruding the mixture.

The invention further relates to a second method for manufacturing the composite material, comprising:

supplying an organo-modified layered double hydroxide material corresponding to formula (I):

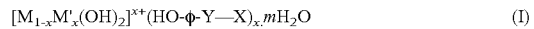

supplying precursors of the polymer matrix,
mixing compound (I) and the precursors of the polymer matrix,
applying conditions to the mixture that allow polymerization of the precursors.

The invention further relates to the use of an organo-modified layered double hydroxide material corresponding to formula (I):

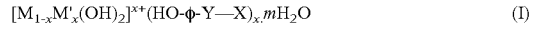

for endowing a matrix of polymers with improved properties of mechanical strength, gas-tightness, and processability.

The invention further relates to a kit for manufacturing the composite material, said kit comprising at least one organo-modified layered double hydroxide material corresponding to formula (I)

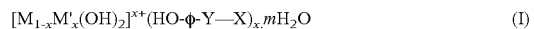

and at least a poly(butylene succinate) or a poly(propylene succinate) or a composition of precursors of poly(butylene succinate) or a composition of precursors of poly(propylene succinate).

According to a preferred embodiment, X represents —COO⁻.

According to a preferred embodiment, Y represents —CH₂—CH₂—.

According to a preferred embodiment, φ is para substituted.

According to a preferred embodiment, the compound of formula (I) corresponds to formula (Ia):

in which φ is para substituted.
According to a preferred embodiment, 0.2≤x≤0.4.
According to a preferred embodiment, M represents one or more cations selected from Mg and Zn.
According to a preferred embodiment, M' represents one or more cations selected from Al and Fe.
According to a preferred embodiment: The compound of formula (I) corresponds to formula (Ia):

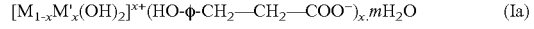

in which φ is para substituted,
0.1≤x≤0.5,
M represents one or more cations selected from Mg and Zn and M' represents one or more cations selected from Al and Fe.
According to a preferred embodiment:
The compound of formula (I) corresponds to formula (Ia):

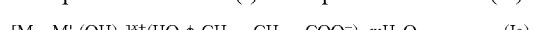

in which φ is para substituted,
0.2≤x≤0.4,
M represents one or more cations selected from Mg and Zn and M' represents one or more cations selected from Al and Fe.

According to a preferred embodiment, the polymer matrix is based on poly(butylene succinate).

According to a preferred embodiment, the polymer matrix comprises one or more polymers or copolymers selected from: poly(ε-caprolactone), poly(lactic acid), polyhydroxyalkanoate, poly(ethylene terephthalate), poly(butylene terephthalate), poly(ethylene naphthalate), poly(ethylene adipate), poly(ethylene succinate), poly(propylene succinate), polypropylene, polyethylene, their copolymers and the copolymers that they form with poly(butylene succinate) (PBS).

According to a preferred embodiment, the polymer matrix essentially consists of poly(butylene succinate).

According to a preferred embodiment, the material (I) represents from 0.1 to 10 wt % relative to the total weight of the polymer matrix.

The nanocomposite polymer approach on which the materials of the invention are based makes it possible to:
increase the thermal stability of the polymer,
reduce the permeability of the polymer (gases, solvents),
improve the conditions of application, as the processability is adaptable as a function of the rheological properties, which in their turn can be modulated as a function of the level of filler,
increase the mechanical properties and usage properties of the polymers,
avoid the use of organic chain extenders that are released by the polymer matrix and pose problems of toxicity.

The use of the layered double hydroxides as an inorganic matrix offers several advantages:
the compositions of the LDH materials selected are biocompatible (some are used in the health sector as antacids)
it is a lamellar material supplying tortuousness,
the composite polymers comprising them have a high mechanical modulus and increased thermal stability,
these materials are biodegradable,
some LDHs lead to a composite that is compatible with use in the food sector.

Although a great many PBS composites are described in the prior art, including organo-modified PBS/LDH among others, at present there is no nanocomposite PBS polymer with mechanical moduli comparable to those obtained according to the invention. Nor is there a nanocomposite PPS polymer that has mechanical properties (modulus) comparable to those obtained according to the invention. Remarkably, these properties are obtained by adding very small amounts of organo-modified LDHs. The properties of the composite materials obtained mean that they can be processed by common techniques such as extrusion.

The materials of the invention can be obtained by two different operating procedures:
reactive extrusion leading to chain coupling, and
polycondensation in situ.

These processes are complementary and may be adapted as required. They are simple and inexpensive to use.

In contrast to the current technology, the invention proposes an approach that takes the life cycle of the material into account (LCA, or Life Cycle Assessment).

DETAILED DESCRIPTION

The expression "consists essentially of" or "is essentially made up of" followed by one or more features means that the method or the material of the invention may include, besides the components or steps explicitly enumerated, components or steps that do not significantly alter the properties and features of the invention.

Organo-Modified Layered Double Hydroxide (LDH) Material:

The invention relates to LDH materials organo-modified with hydroxyphenylpropionic acid (HPPA), or optionally with 2-(4-hydroxyphenyl)ethylsulfonic acid or with a hydroxyphenylpropenoic acid.

These materials correspond to formula (I):

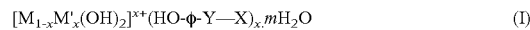

in which:
X represents a group selected from: —COO⁻ and —SO₃,
Y represents a group selected from: —CH₂—CH₂— and —CH═CH—,
φ represents a phenyl group substituted in the ortho, meta or para position, on the one hand with the hydroxyl group, and on the other hand with the group (—Y—X),
m represents a number in the range from 0 to 2,
and
either:
M represents one or more divalent cations selected from: Mg, Zn, Co, Ni, Ca, Cu,
M' represents one or more cations selected from: Al, Ga, Fe, Cr, and
x represents a number, 0<x<1, preferably 0.1≤x≤0.5
or, according to a variant:
M represents Li, M' represents Al, and x=2/3.

According to a preferred embodiment of the invention, X represents —COO⁻.

According to a preferred embodiment of the invention, the compound of formula (I) corresponds to formula (Ia):

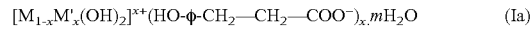

in which φ is para substituted.

The organo-modified LDHs are materials that are well known. Some are described notably in: Coelho, C et al., Eur. J. Inorg. Chem., 2012, 5252-5258; Hennous, M. et al., Applied Clay Science, 71, 2013, 42-48; Sisti L., et al., J. Applied Polym. Sci., 2013, 1931-1939.

The materials of the invention differ from those described in these articles by the choice of the organic moiety, and in particular: 3-(4-hydroxyphenyl)propionic acid, 2-(4-hydroxyphenyl)ethylsulfonic acid, 3-(4-hydroxyphenyl)propenoic acid, 3-(3-hydroxyphenyl)propenoic acid, 3-(2-hydroxyphenyl)propenoic acid. Advantageously, the invention relates to 3-(4-hydroxyphenyl)propionic acid.

According to a first embodiment of the invention:
M represents one or more divalent cations selected from: Mg, Zn, Co, Ni, Ca, Cu,
M' represents one or more cations selected from: Al, Ga, Fe, Cr
x may assume values between 0 and 1, preferably: 0.1≤x≤0.5, better still: 0.2≤x≤0.4, which corresponds to: 1.5≤M/M'≤4

The cations M are selected from the divalent metal cations, also designated $M^{II}$, whereas the cations M' are selected from the trivalent metal cations, also designated $M^{III}$.

The materials of formula (I) have a crystalline structure, consisting of layers formed from octahedral units with adjacent sides. Each octahedron consists of a cation $M^{II}$ or $M^{III}$ surrounded by six OH. The presence in a layer of cations $M^{III}$ induces an excess of positive charge, which is balanced by an exchangeable anion positioned in the space between layers, where the water molecules are also located.

In formula (I), some of the cations M and/or of the cations M' may be substituted with one or more other cations selected from the two lists given above. For example, Mg may represent 95% of the cations M, whereas Zn represents the remaining 5%.

According to a preferred embodiment of the invention, M represents one or more cations selected from: Mg, Zn, Co, Ca, preferably Mg and Zn.

According to a preferred embodiment of the invention, M' (trivalent) represents one or more cations selected from: Al, Fe, Cr, Ga, preferably Al and Fe.

Preferably Mg represents at least 50%, advantageously at least 75%, better still at least 100% of the cations M, and Al represents at least 50%, advantageously at least 75%, better still at least 100% of the cations M', the percentages being expressed in moles of each of the cations selected, relative to the total number of moles of cation M and of cation M', respectively.

Advantageously, in formula (I), M represents Mg and M' represents Al. This choice has the advantage of supplying a material (I) that is nontoxic, and compatible with application in the food sector.

According to a second embodiment of the invention, the material (I) corresponds to the formula:

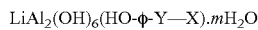

$LiAl_2(OH)_6(HO-\phi-Y-X).mH_2O$

Preferably, according to this variant, the material (I) corresponds to the formula:

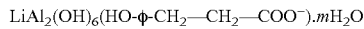

$LiAl_2(OH)_6(HO-\phi-CH_2-CH_2-COO^-).mH_2O$

This material also has the advantage of supplying a material (I) that is nontoxic, and compatible with application in the food sector.

As is known, the organo-modified LDHs are organized in sheets of the brucite type, in which the anionic species at the interlayer can easily be exchanged.

These materials are prepared by mixing the salts $M^{+2}(A^{n-})_{2/n}$ and $M'^{+3}(A^{n-})_{3/n}$, and A represents an anionic group of valence n, with:
- the acid HO-φ-Y—XH, advantageously the acid HO-φ-CH$_2$—CH$_2$—COOH,
- an alkali-metal or alkaline-earth salt of the acid HO-φ-Y—XH, advantageously a salt of the acid HO-φ-CH$_2$—CH$_2$—COOH, with Li$^+$, Na$^+$, K$^+$, Mg$^{2+}$, Ca$^{2+}$, or
- an ester HO-φ-Y—XR, advantageously an ester HO-φ-CH$_2$—CH$_2$—COOR, and R represents an alkyl, aryl or aralkyl group. For example, R is selected from: a group CH$_3$, C$_2$H$_5$.

For example, $A^{n-}$ may be selected from $NO_3^-$, $CO_3^{2-}$, $Cl^-$, $F^-$, $SO_4^{2-}$, $OH^-$, $CH_3COO^-$.

Mixing is carried out in a basic aqueous medium, in conditions such as to cause precipitation of the salts of formula (I). In practice, the reaction mixture is adjusted to a pH above the pKa of the organic acid in question. Advantageously, mixing is carried out at a pH in the range from 7 to 11.

The materials of formula (I) are in the form of nanoparticles. They have the advantage that they can be controlled in terms of particle size.

In formula (I), preferably $0.2 \leq x \leq 0.4$

The parameter x is controlled by the proportions of the salts that are added to the mixture for forming compound (I).

During manufacture of the material of the invention corresponding to formula (I), the organic group 3-(4-hydroxyphenyl)propionic acid, or optionally 2-(4-hydroxyphenyl)ethylsulfonic acid, 3-(4-hydroxyphenyl)propenoic acid, 3-(3-hydroxyphenyl)propenoic acid, 3-(2-hydroxyphenyl) propenoic acid, may be used mixed with other organic groups of an anionic nature to form an organo-modified LDH material comprising several organic substituents. According to this embodiment, we obtain:
- either a mixture of materials, including a material corresponding to formula (I) and at least one second similar material with a different organic group,
- or a co-intercalation of the organic groups in the inorganic matrix.

According to this variant of the invention, only a part of the material obtained corresponds to formula (I), the remainder being an organo-modified LDH with at least one other organic anion.

Advantageously, the invention relates to a composition of organo-modified LDH material of which at least 50%, or preferably at least 75%, better still at least 95% corresponds to formula (I), advantageously corresponds to formula (Ia) with φ para-substituted, the percentages being expressed in moles, relative to the total number of moles of material (percentage evaluated assuming synthesis at a yield level of 100%)

Preferably, the invention relates to a material consisting essentially of compound (I), or better still a material consisting essentially of compound (Ia) with φ para-substituted.

The choice of the cations M and M' makes it possible to control certain properties of the organo-modified LDH material itself, such as: its absence of toxicity, its degree of aggregation and crystallinity and therefore its form factor, an important characteristic for the barrier effect.

The choice of the cations M and M' also makes it possible to control certain properties of the polymer/organo-modified LDH composite materials, such as the optical properties (transparency, color), biodegradability, anti-UV properties, but also the oxygen "scavenger", anti-moisture, and anti-biocide properties.

The structure of the material of formula (I) is confirmed by X-ray diffraction (XRD).

Polymer/Organo-Modified (LDH) Composite Material:

The invention relates to composite materials based on organo-modified LDH with 3-(4-hydroxyphenyl)propionic acid (HPPA), or optionally 2-(4-hydroxyphenyl)ethylsulfonic acid, 3-(4-hydroxyphenyl)propenoic acid, 3-(3-hydroxyphenyl)propenoic acid, or 3-(2-hydroxyphenyl)propenoic acid, and a polymer matrix based on poly(butylene succinate) (PBS), or poly(propylene succinate) (PPS).

Preferably, the invention relates to composite materials based on poly(butylene succinate) (PBS).

In the present description, the expression "polymer" denotes both homopolymers and copolymers. It includes mixtures of polymers, oligomers, mixtures of monomers, oligomers and polymers.

The intercalated organic compound of material (I), preferably of material (Ia) with φ para-substituted, can easily be substituted with polymers or reacted with polymers to give a polymer/organo-modified LDH composite material.

Polymer matrix based on poly(butylene succinate) means a polymer composition that comprises at least a poly(butylene succinate) or a copolymer of poly(butylene succinate) and at least one other polymer.

Polymer matrix based on poly(propylene succinate) means a polymer composition that comprises at least a poly(propylene succinate) or a copolymer of poly(propylene succinate) and at least one other polymer.

It may comprise other polymers and copolymers, preferably thermoplastics.

The other (co)polymers are advantageously selected from the polyesters and the copolymers of polyesters. These are well-known thermoplastics, some of which can be obtained from renewable raw materials.

As examples of polyester, we may mention: poly(ε-caprolactone) (PCL), poly(lactic acid) (PLA), polyhydroxyalkanoate (PHA), poly(ethylene terephthalate) (PET), poly(butylene terephthalate) (PBT), poly(ethylene naphthalate) (PEN).

As examples of polyester copolymers, we may mention: poly(ethylene adipate) (PEA), poly(ethylene succinate) (PES), poly(propylene succinate) (PPS).

The invention also relates to the copolymers obtained from various monomers and oligomers that are precursors of the aforementioned polymers and copolymers, as well as their copolymers with poly(butylene succinate).

It further relates to mixtures of the aforementioned polymers and copolymers with other polymers and copolymers that can be processed thermoplastically, such as the polyolefins, for example polypropylene, polyethylene (LDPE, HDPE), polystyrene.

Preferably, the invention relates to polymers and copolymers that can be produced from renewable resources, such as poly(butylene succinate) (PBS), whose formula is illustrated below:

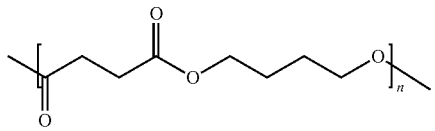

PBS is a well-known biodegradable polymer that can be biosourced, and can be used notably for applications in which its biodegradability is an asset, for example for manufacturing disposable cutlery, fishing nets, or mulching films.

Preferably, the invention employs polymers, copolymers and mixtures of polymers and of copolymers in which at least 50 wt % is poly(butylene succinate), preferably at least 75 wt % is poly(butylene succinate), and better still at least 95 wt % is poly(butylene succinate).

This means that at least 50 wt % (preferably at least 75%, or better still 95%) of the polymers, or of the monomer or oligomer units of a copolymer, or monomer or oligomer units of a mixture of polymers and of copolymers, are butylene succinate units.

The percentage of poly(butylene succinate) or of butylene succinate units in a mixture is controlled by the choice of the raw materials used for carrying out the polymerization and/or the mixture of (co)polymers.

According to the preferred embodiment of the invention, the polymer matrix essentially consists of poly(butylene succinate).

As examples of commercially available poly(butylene succinates) that can be used in the invention, we may mention the following products:

PBE003 Nature Plast—extrusion grade, marketed by the company NaturePlast,

Enpol IRE G4560—injection fluid grade, marketed by the company Ire Chemical Ltd.

The polymer matrix may further comprise conventional additives such as plasticizers, fillers, and anti-UV, antioxidant, stabilizing, and coloring additives.

The proportion of compound (I), preferably of compound (Ia) with φ para-substituted, and of polymer matrix in the composite material is preferably from 0.1 to 10 wt %, advantageously from 0.5 to 5 wt % of compound (I), preferably of compound (Ia) with φ para-substituted, relative to the weight of polymer matrix.

The biodegradability of the composite materials of the invention can be evaluated for example by a respirometric method following the protocol ISO 14852 (aerobic liquid medium) to comply with standard EN 13432.

Methods of Manufacture of the Composite Material

The material of the invention can be manufactured by two different processes:

According to a first embodiment of the invention, the material of formula (I) and the polymer matrix are mixed together at a temperature greater than or equal to the melting point of the (co)polymer(s), and then the mixture is extruded.

Preferably, the polymer matrix used consists essentially of PBS.

As the melting point of PBS is significantly lower than the temperature of degradation of the fillers of formula (I), this method can be carried out with a matrix based on PBS without risk of degradation of the organo-modified LDH (I).

When the polymer matrix has a melting point close to the temperature of degradation of the fillers of formula (I), or above this temperature, preference is given to the method according to the second variant described below.

According to a second embodiment of the invention, compound (I) and the precursors of the polymer matrix are mixed together, and then the mixture is subjected to conditions allowing polymerization of the precursors to form the polymer matrix.

"Precursors of polymers and copolymers" means monomers, oligomers, pre-polymers, polymers and copolymers, and crosslinking agents.

Preferably, the polymer precursors employed consist essentially of precursors of PBS.

The raw materials employed for producing PBS, or used as precursors of PBS, are succinic acid and its diesters, as well as 1,4-butanediol.

The raw materials employed for producing PPS, or used as precursors of PPS, are succinic acid and its diesters, as well as 1,3-propanediol.

Succinic acid is preferably obtained from agricultural resources, or is biosourced, but may also be of fossil origin. For example, succinic acid may be produced by fermentation using renewable, nonfossil raw materials, as described notably in application WO 2011/064151.

Among the diesters of succinic acid that can be used for synthesis of the composite, we may advantageously mention the dialkyl succinates, for example dimethyl or diethyl succinate, preferably dimethyl succinate. It can be obtained by an esterification reaction of succinic acid.

1,4-Butanediol is preferably derived from hydrogenation of biosourced succinic acid or obtained by fermentation in the presence of microorganisms. It is also possible to use 1,4-butanediol of fossil origin.

1,3-Propanediol is preferably derived from hydrogenation of biosourced succinic acid or obtained by fermentation in the presence of microorganisms. It is also possible to use 1,3-propanediol of fossil origin.

Among the conditions promoting polymerization, we may mention: a temperature rise, a pressure below atmospheric pressure, removal of byproducts from the reaction, and use of a catalyst.

If succinic acid is used, the esterification reaction leads to the formation of water. The method is advantageously carried out with partial or complete removal of the water formed during this reaction.

If an ester of succinic acid is used, the transesterification reaction leads to the formation of alcohol. The method is advantageously carried out with partial or complete removal of the alcohol formed during this reaction.

According to each of the two variants, the reaction can be carried out in the presence of an esterification or transesterification catalyst, which is preferably selected to be inert with respect to water and/or the alcohol that is formed. For example, the catalyst may be based on titanium or zirconium.

The method is preferably carried out in the following conditions: use of dimethyl succinate, use of a titanium-based catalyst, heating at a temperature greater than or equal to 170° C. until the methanol is eliminated, heating at a temperature greater than or equal to 210° C., and then application of a vacuum less than or equal to 0.5 mbar.

Applications:

The polymer/organo-modified LDH composite materials of the invention can be used in all the applications of thermoplastic polymers. They have the advantage of enhanced mechanical properties, so that methods of application can be envisaged that are new relative to the unmodified biosourced polymers: the composites of the invention based on PBS or PPS are easily extrudable.

The composite materials of the invention can be processed by the conventional methods for processing thermoplastics, for example by methods of extrusion blow molding, extrusion-forming, extrusion-calendering, and extrusion-inflation.

The composite materials of the invention may for example be used in the manufacture of packaging materials, in particular in the food processing sector, owing to their absence of toxicity. They may also be used in agriculture, for example for manufacturing agricultural films.

The choice of polymer matrix and selection of the proportion of material (I) in the composite make it possible to control the degradation kinetics of the material.

FIGURES

FIGS. 1, 2a, 2b, 3a, 3b: Graphical representation of the melt viscoelasticity of various composites PBS/(Mg or Zn: HPPA-modified Al) Cole-Cole diagram with abscissa: real component of complex viscosity; ordinate: imaginary component of complex viscosity.

FIGS. 4a, 4b, 5a, 5b: Graphical representation of the melt viscoelasticity of various composites PBS/(Mg: Al modified with HPPA or various surfactants) Cole-Cole diagram with abscissa: real component of complex viscosity; ordinate: imaginary component of complex viscosity.

Figure 6:
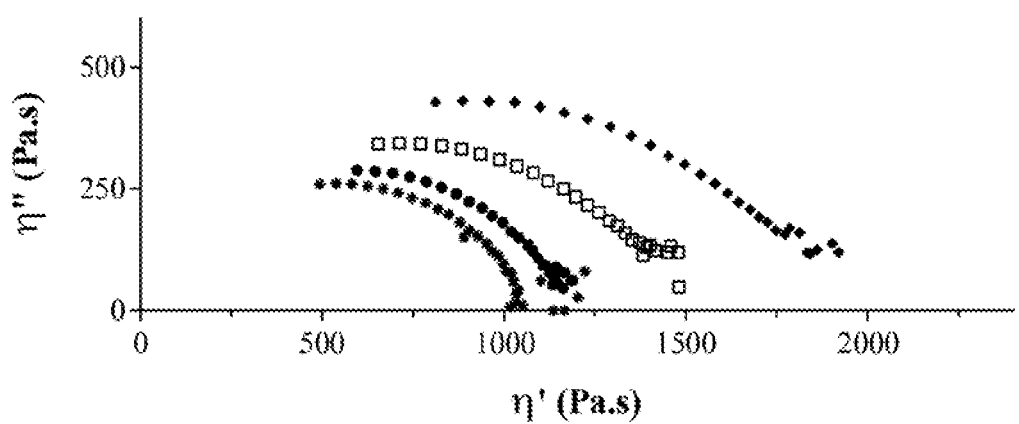

FIG. 6: Graphical representation of the melt viscoelasticity of various composites PPS/(Mg: HPPA-modified Al) Cole-Cole diagram with abscissa: real component of complex viscosity; ordinate: imaginary component of complex viscosity.

Figure 7:
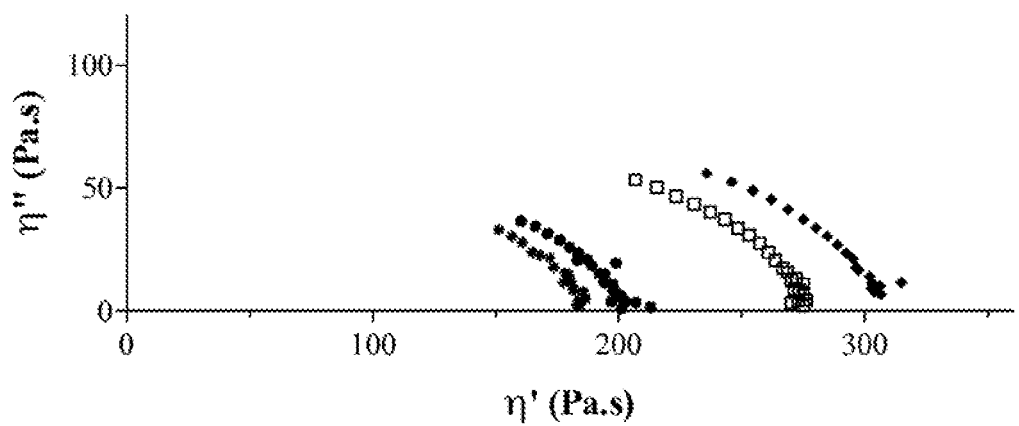

FIG. 7: Graphical representation of the melt viscoelasticity of various composites PBSA/(Mg: HPPA-modified Al) Cole-Cole diagram with abscissa: real component of complex viscosity; ordinate: imaginary component of complex viscosity.

FIG. 1: PBS-LDH$_{ZnAl}$-HPPA in situ (protocol 3) (▽) PBS NaturePlast; (Δ) PBS-LDH$_{ZnAl}$-HPPA 1 wt %; (○) PBS-LDH$_{ZnAl}$-HPPA 3 wt %; (□) PBS-LDH$_{ZnAl}$-HPPA 5 wt %; (◇) PBS-LDH$_{ZnAl}$-HPPA 10 wt %.

Figure 2A:
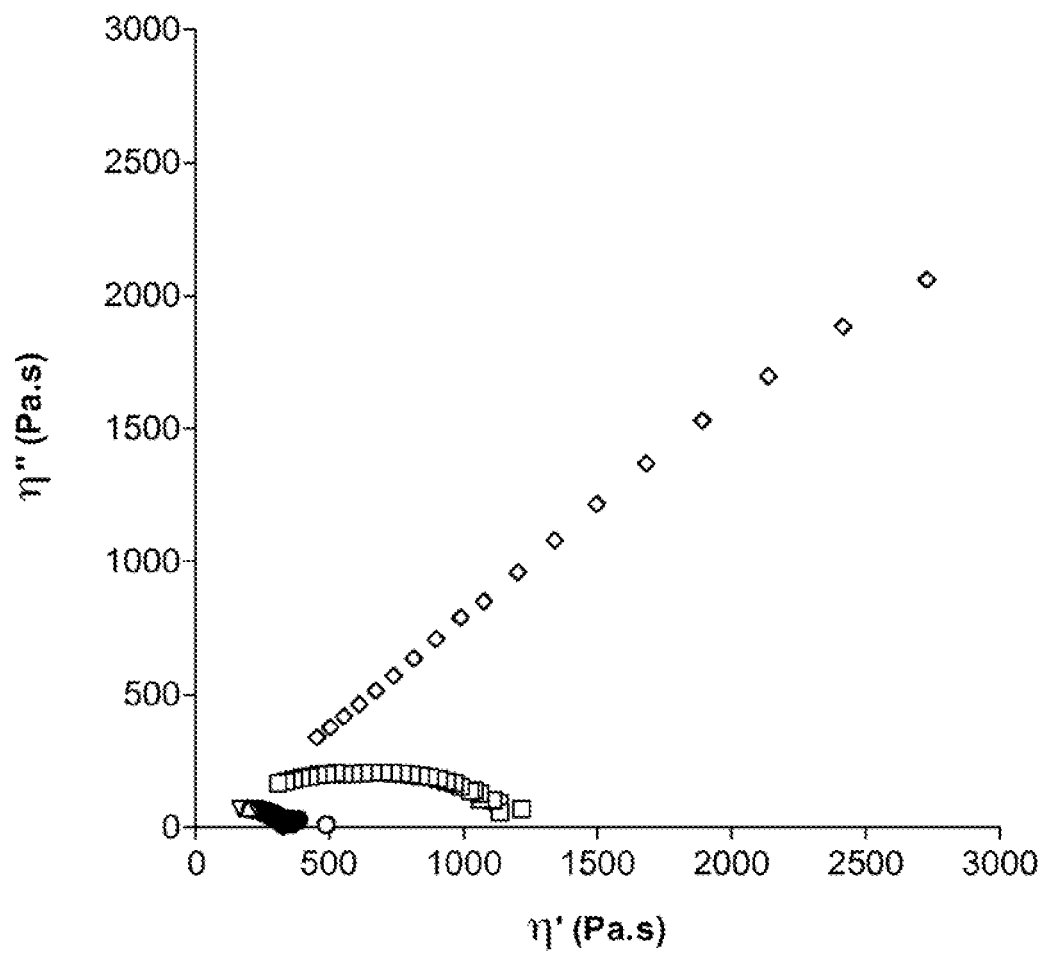

FIG. 2a: PBS-LDH$_{MgAl}$-HPPA in situ (protocol 3) (▽) PBS NaturePlast; (Δ) PBS-LDH$_{MgAl}$-HPPA 1 wt %; (○) PBS-LDH$_{MgAl}$-HPPA 3 wt %; (□) PBS-LDH$_{MgAl}$-HPPA 5 wt %; (◇) PBS-LDH$_{MgAl}$-HPPA 10 wt %.

Figure 2B:
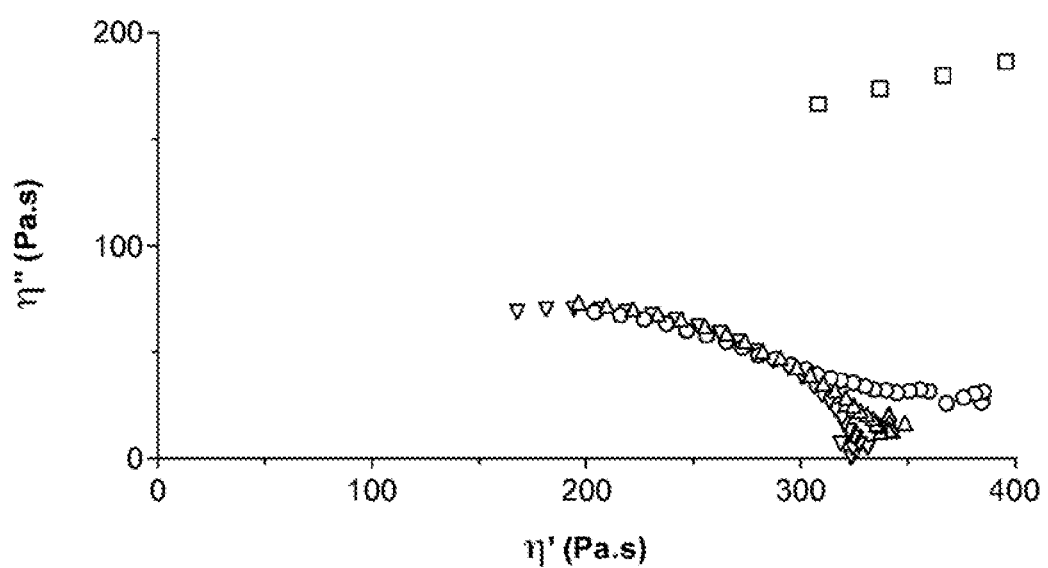

FIG. 2b: Enlargement of FIG. 2a between 0 and 400 Pa·s PBS-LDH$_{MgAl}$-HPPA in situ (▽) PBS NaturePlast; (Δ) PBS-LDH$_{MgAl}$-HPPA 1 wt %; (○) PBS-LDH$_{MgAl}$-HPPA 3 wt %; (□) PBS-LDH$_{MgAl}$-HPPA 5 wt %; (◇) PBS-LDH$_{MgAl}$-HPPA 10 wt %.

Figure 3A:
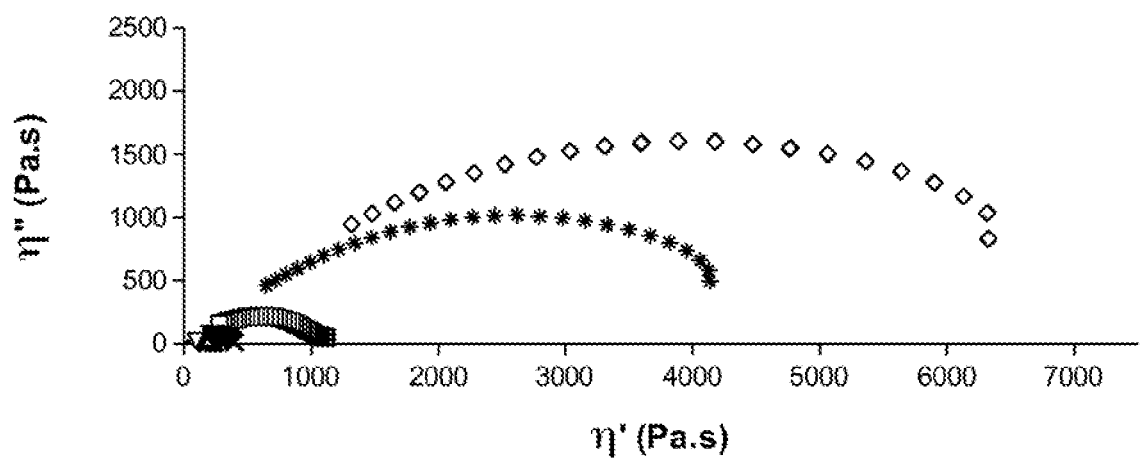

FIG. 3a: PBS-LDH$_{ZnAl}$-HPPA "ex-situ" (protocol 2) (▽) PBS Enpol IRE G4560; (Δ) PBS-LDH$_{ZnAl}$-HPPA 1 wt %; (x) PBS-LDH$_{ZnAl}$-HPPA 2.5 wt %; (□) PBS-LDH$_{ZnAl}$-HPPA 5 wt %; (*) PBS-LDH$_{ZnAl}$-HPPA 7.5 wt %; (◇) PBS-LDH$_{ZnAl}$-HPPA 10 wt %.

Figure 3B:
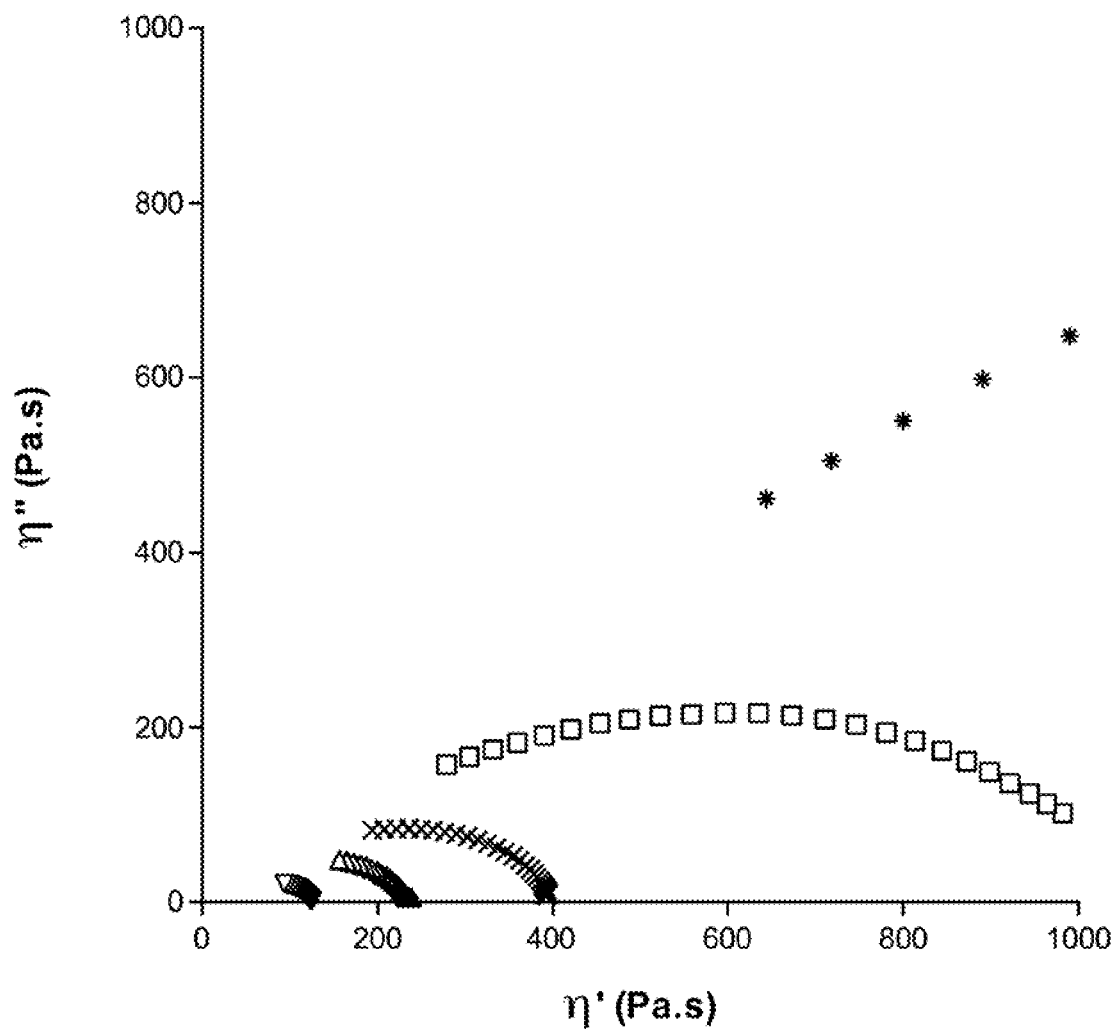

FIG. 3b: Enlargement of FIG. 3a between 0 and 1000 Pa·s PBS-LDH$_{ZnAl}$-HPPA "ex situ" (▽) PBS Enpol IRE G4560; (Δ) PBS-LDH$_{ZnAl}$-HPPA 1 wt %; (x) PBS-LDH$_{ZnAl}$-HPPA 2.5 wt %; (□) PBS-LDH$_{ZnAl}$-HPPA 5 wt %; (*) PBS-LDH$_{ZnAl}$-HPPA 7.5 wt %; (◇) PBS-LDH$_{ZnAl}$-HPPA 10 wt %.

Figure 4A:
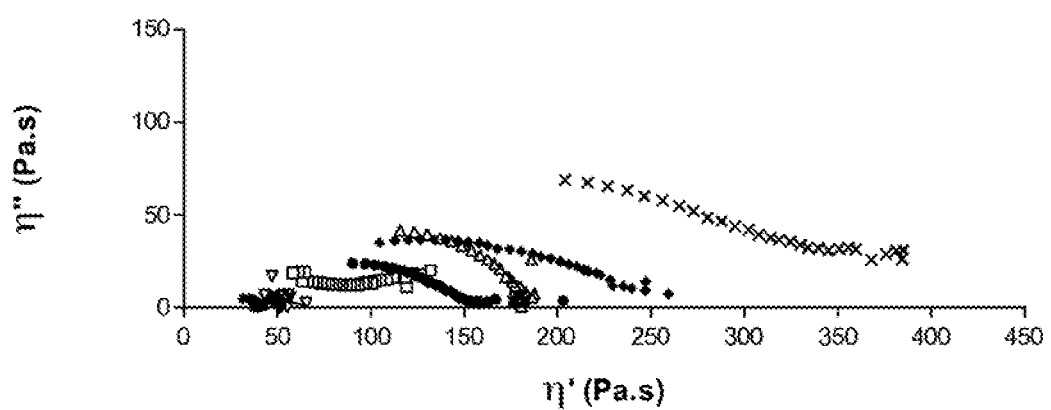

FIG. 4a: PBS-LDH$_{MgAl}$-HPPA in situ (protocol 3) (*) PBS prepared by polycondensation (protocol 3); (x) PBS-LDH$_{MgAl}$-HPPA 3 wt %; (▽) PBS-LDH$_{MgAl}$-citrate 3 wt %; (♦) PBS-LDH$_{MgAl}$-succinate 3 wt %; (●) PBS-LDH A-sebacate 3 wt %; (□) PBS-LDH$_{MgAl}$-adipate 3 wt %; (Δ) PBS-LDH$_{MgAl}$-ricinoleate 3 wt %.

Figure 4B:
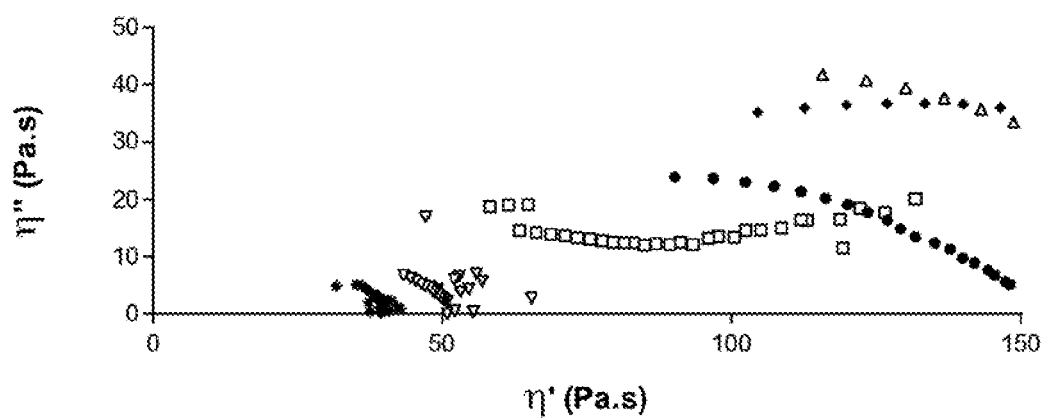

FIG. 4b: Enlargement of FIG. 4a between 0 and 150 Pa·s PBS-LDH$_{MgAl}$-HPPA in situ (protocol 3) (*) PBS prepared by polycondensation (protocol 3); (x) PBS-LDH$_{MgAl}$-HPPA 3 wt %; (▽) PBS-LDH$_{MgAl}$-citrate 3 wt %; (♦) PBS-LDH$_{MgAl}$-succinate 3 wt %; (●) PBS-LDH$_{MgAl}$-sebacate 3 wt %; (□) PBS-LDH$_{MgAl}$-adipate 3 wt %; (Δ) PBS-LDH$_{MgAl}$-ricinoleate 3 wt %.

Figure 5A:
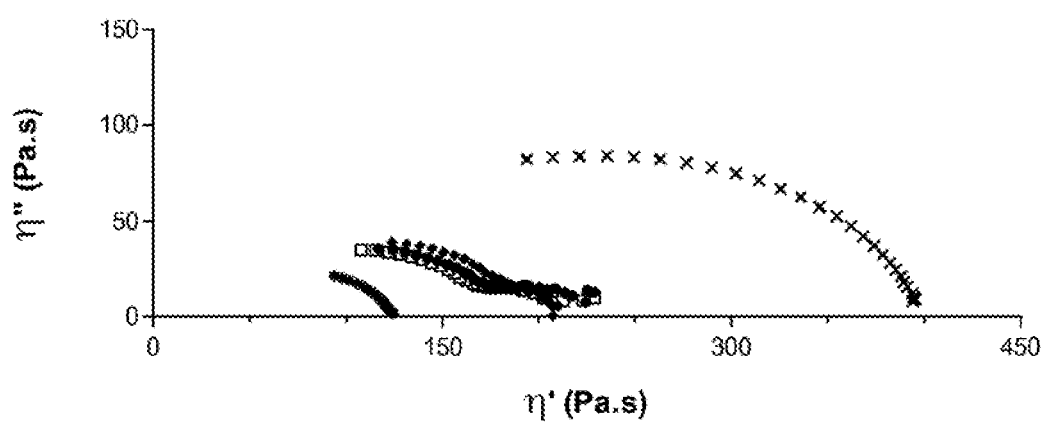

FIG. 5a: PBS-LDH$_{MgAl}$-HPPA "ex-situ" (protocol 2) (*) PBS Enpol IRE G4560; (x) PBS-LDH$_{MgAl}$-HPPA 2.5 wt %; (♦) PBS-LDH$_{MgAl}$-succinate 3 wt %; (●) PBS-LDH$_{MgAl}$-sebacate 3 wt %; (□) PBS-LDH$_{MgAl}$-adipate 3 wt %.

Figure 5B:
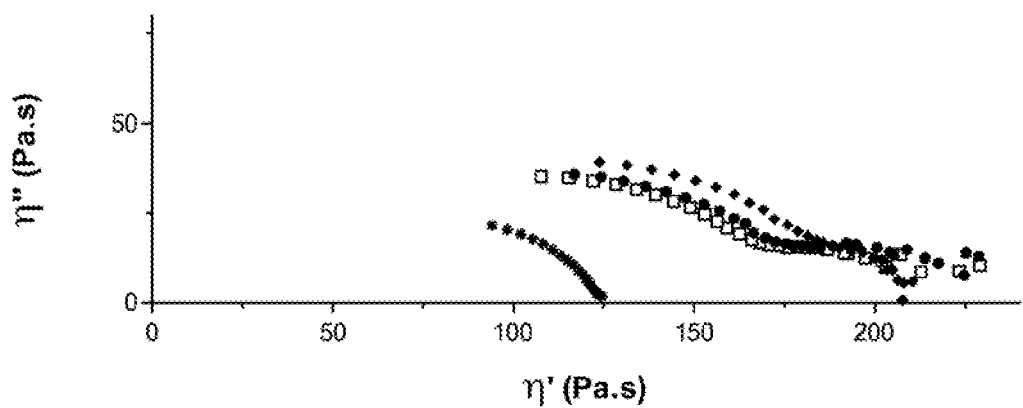

FIG. 5b: Enlargement of FIG. 5a between 0 and 250 Pa·s PBS-LDH$_{MgAl}$-HPPA "ex-situ" (protocol 2) (*) PBS Enpol IRE G4560; (x) PBS-LDH$_{MgAl}$-HPPA 2.5 wt %; (♦) PBS-LDH$_{MgAl}$-succinate 3 wt %; (●) PBS-LDH$_{MgAl}$-sebacate 3 wt %; (□) PBS-LDH$_{MgAl}$-adipate 3 wt %.

FIG. 6: PPS-LDH$_{MgAl}$-HPPA "ex-situ" (protocol 2) (*) PPS (protocol 4); (●) PPS-LDH$_{MgAl}$-HPPA 1 wt %; (□) PPS-LDH$_{MgAl}$-HPPA 5 wt %; (♦) PPS-LDH$_{MgAl}$-HPPA 10 wt %.

FIG. 7: PBSA-LDH$_{MgAl}$-HPPA "ex-situ" (protocol 2) (*); PBSA (protocol 5); (●) PBSA-LDH$_{MgAl}$-HPPA 1 wt %; (□) PBSA-LDH$_{MgAl}$-HPPA 5 wt %; (♦) PBSA-LDH$_{MgAl}$-HPPA 10 wt %.

EXPERIMENTAL SECTION

I—Materials and Methods:
Raw Materials:
PBS: A Type of PBS was Used for the Reactive Mixing:
  PBS1: Enpol IRE G4560—injection fluid grade, marketed by the company Ire Chemical Ltd.
  PBS2: PBE003 Nature Plast—extrusion grade, marketed by the company NaturePlast
PPS (poly(propylene)succinate): Prepared according to protocol 4
PBSA (poly(butylene succinate-co-adipate): Prepared according to protocol 5
Methods of Processing:
Preparation of Organo-Modified LDH (Protocol 1):

This is carried out as a "one pot" synthesis to obtain the hybrid assembly either in the form of powder, or in the form of paste.

A quantity of M(NO$_3$)$_2$(M=Mg, Zn, Co, Ni, Ca, Cu) and of M'(NO$_3$)$_3$(M'=Al, Ga, Fe, Co) is added to a reactor containing an amount of organic molecule of the carboxylic acid type or ester of carboxylic acid (HPPA). The pH of the mixture is controlled to pH=9±0.1 by adding soda, the whole being placed under nitrogen. Coprecipitation of the salts at basic pH is effected at room temperature. The paste formed is then centrifuged and washed with deionized water 3 times to remove the excess HPPA and unreacted reactants. The yield is high: in the region of 95% taking into account the theoretical empirical formula (calculation based on thermogravimetry and elemental chemical analysis).

Extrusion (Protocol 2):

The mixtures were prepared in the molten state in co-rotating twin-screw extrusion using a THERMO Instrument micro-compounder. The total amount of material introduced is about 6 g (polymer+organo-modified LDH), with 1, 2.5, 5, 7.5, and 10 wt % of the organo-modified LDH relative to the weight of polymer, the rotary speed of the screws is 100 rev/min for kneading times of 2 to 3 min maximum at 140° C. A control (T1) is prepared without filler.

Polycondensation In Situ (Protocol 3):

A concave-bottomed wide-neck glass reactor (250 ml capacity) was charged with 1, 3, 5, 10% of the organo-modified LDH (for example 1.4 g, which corresponds to 3 wt % relative to the theoretical yield of the polymer), butanediol (30 g, 0.33 mol) and titanium tetrabutoxide (0.06 g, $1.7 \cdot 10^{-4}$ mol).

The reactor was closed with a three-neck cover equipped with a mechanical stirrer and a torquemeter. The system is connected to a water-cooled condenser and is immersed in an oil bath with thermostatic control to 190° C., stirring vigorously. After one hour the oil bath was cooled to 180° C. and dimethyl succinate (40 g, 0.27 mol) was added, the temperature was then raised to 190° C. and was kept at this value until the methanol had distilled (about 1 hour). The distillate recovered during this first step in the condenser was collected and analyzed by FT-IR. The temperature was then increased to 230° C., the cover was heated to a temperature of 110° C. with a strip heater and the reactor is connected to a condenser cooled with liquid nitrogen. Dynamic vacuum was then applied for 60 minutes to reach 0.1 mbar. After a variable time depending on the cation composition (about 90 min for the $Mg_2Al$ series), a very viscous product, transparent and with a light brownish color in the molten state was removed from the reactor. The molecular structure of PBS was confirmed by $^1H$ NMR.

Polycondensation (Protocol 4):

A concave-bottomed wide-neck glass reactor (250 ml capacity) was charged with 1,3-propanediol (34 g, 0.45 mol) and dimethyl succinate (51 g, 0.35 mol) and titanium tetrabutoxide (0.07 g, $2.0 \cdot 10^{-4}$ mol). The reactor was closed with a three-neck cover equipped with a mechanical stirrer and a torquemeter. The system is connected to a water-cooled condenser and is immersed in an oil bath with thermostatic control to 200° C., with stirring at 340 rev/min. The cover was heated to a temperature of 80° C. with a strip heater. The oil bath was maintained at 200° C. until the methanol had distilled (about 1 hour). The distillate recovered during this first step in the condenser was collected and analyzed by FT-IR. The cover was heated to a temperature of 90° C., and the reactor is connected to a condenser cooled with liquid nitrogen. The temperature ramp up to 230° C. and dynamic vacuum to 0.9 mbar were then applied for about 60 minutes. After about 240 min, a very viscous product, transparent and with a light yellow color, and in the molten state, was removed from the reactor. The molecular structure of PPS was confirmed by $^1H$ NMR.

Polycondensation (Protocol 5):

A concave-bottomed wide-neck glass reactor (250 ml capacity) was charged with 1,4-butanediol (40 g, 0.44 mol) and dimethyl succinate (43 g, 0.30 mol), dimethyl adipate (13 g, 0.074 mol) and titanium tetrabutoxide (0.05 g, $1.6 \cdot 10^{-4}$ mol). The reactor was closed with a three-neck cover equipped with a mechanical stirrer and a torquemeter. The system is connected to a water-cooled condenser and immersed in an oil bath with thermostatic control to 190° C., with stirring at 200 rev/min. The cover was heated to a temperature of 80° C. with a strip heater. The oil bath was maintained at 190° C. until the methanol had distilled (about 1 hour 30 minutes). The distillate recovered during this first step in the condenser was collected and analyzed by FT-IR. The cover was heated to a temperature of 110° C. and the reactor is connected to a condenser cooled with liquid nitrogen. The temperature ramp up to 230° C. and dynamic vacuum to 0.4 mbar were then applied for about 40 minutes. After about 300 min, a very viscous product, transparent and with a light yellow color, and in the molten state, was removed from the reactor. The molecular structure of PBSA was confirmed by $^1H$ NMR.

Methods of Characterization:

X-ray diffraction (XRD), Fourier Transform Infrared Spectroscopy (FTIR), thermogravimetric analysis (TGA), Differential Scanning Calorimetry (DSC), Dynamic Mechanical Thermal Analysis (DMTA).

Rheology Testing:

The rheological measurements were performed in parallel plane-plane geometry and in oscillating mode using an ARESTA Instrument mechanical spectrometer at stressing frequencies between 0.1 and 100 rad/s.

II—Synthesis:

Organo-Modified LDH:

The following materials were prepared from 3-(4-hydroxyphenyl)propionic acid following protocol 1 given above:

TABLE 1

HPPA-modified LDH materials

| Material | M | M' | Formula | Characterization |
|---|---|---|---|---|
| M1 | Mg | Al | $[Mg_{2/3} Al_{1/3}(OH)_2]^{1/3+}$ (HO—φ—$CH_2$—$CH_2$—$COO^-$)$_{1/3}$•m $H_2O$ | XRD, FTIR, TGA |
| M2 | Zn | Al | $[Zn_{2/3} Al_{1/3}(OH)_2]^{1/3+}$ (HO—φ—$CH_2$—$CH_2$—$COO^-$)$_{1/3}$•m $H_2O$ | XRD, FTIR, TGA |

The following materials were prepared from sodium dodecylsulfate (SDS), sodium succinate (SU), sodium sebacate (SE), sodium adipate (AD), citric acid (CA), and ricinoleic acid (RA) following protocol 1 given above:

TABLE 2

LDH materials modified with sodium dodecylsulfate (SDS), sodium succinate (SU), sodium sebacate (SE), sodium adipate (AD), citric acid (CA), and ricinoleic acid (RA) (comparative)

| Material No. | M | M' | Organic anion | Formula | Characterization |
|---|---|---|---|---|---|
| M'1 | Mg | Al | SDS | $[Mg_{2/3}\ Al_{1/3}(OH)_2]^{1/3+}\ (SDS^-)_{1/3} \cdot m\ H_2O$ | XRD, FTIR, TGA |
| M'2 | Zn | Al | SDS | $[Zn_{2/3}\ Al_{1/3}(OH)_2]^{1/3+}\ (SDS^-)_{1/3} \cdot m\ H_2O$ | XRD, FTIR, TGA |
| M'3 | Mg | Al | SU | $[Mg_{2/3}\ Al_{1/3}(OH)_2]^{1/3+}\ (SU^{2-})_{0.16}\ m\ H_2O$ | XRD, FTIR, TGA |
| M'4 | Mg | Al | SE | $[Mg_{2/3}\ Al_{1/3}(OH)_2]^{1/3+}\ (SE^{2-})_{0.16}\ m\ H_2O$ | XRD, FTIR, TGA |
| M'5 | Mg | Al | AD | $[Mg_{2/3}\ Al_{1/3}(OH)_2]^{1/3+}\ (AD^{2-})_{0.16}\ m\ H_2O$ | XRD, FTIR, TGA |
| M'6 | Mg | Al | CA | $[Mg_{2/3}\ Al_{1/3}(OH)_2]^{1/3+}\ (CA^{3-})_{0.11}\ m\ H_2O$ | XRD, FTIR, TGA |
| M'7 | Mg | Al | RA | $[Mg_{2/3}\ Al_{1/3}(OH)_2]^{1/3+}\ (RA^-)_{0.33}\ m\ H_2O$ | XRD, FTIR, TGA |

PBS/Organo-Modified LDH Composite:

The following materials were prepared following protocol 2 above:

TABLE 3

PBS/organo-modified LDH materials according to the invention (C1 to C5), according to the prior art (C'1 to C'5) and controls (T1 to T2)

| Composite No. | Organo-modified LDH | PBS | wt % organo-modified LDH/PBS | Characterization | FIGS. |
|---|---|---|---|---|---|
| C1 | M2 | PBS1 | 1 | XRD, TGA, rheology, | 3 |
| C2 | M2 | PBS1 | 2.5 | XRD, TGA, rheology, | 3 |
| C3 | M2 | PBS1 | 5 | XRD, TGA, rheology, | 3 |
| C4 | M2 | PBS1 | 7.5 | XRD, TGA, rheology, | 3 |
| C5 | M2 | PBS1 | 10 | XRD, TGA, rheology, | 3 |
| C'1 | M'1 | PBS1 | 5 | XRD, TGA, rheology | — |
| C'2 | M'2 | PBS1 | 5 | XRD, TGA, rheology | — |
| C'3 | M'3 | PBS2 | 3 | XRD, TGA, rheology | 5 |
| C'4 | M'4 | PBS2 | 3 | XRD, TGA, rheology | 5 |
| C'5 | M'5 | PBS2 | 3 | XRD, TGA, rheology | 5 |
| T1 | — | PBS1 | — | XRD, TGA, rheology | 1, 2a, 2b, 5a, 5b |
| T2 | — | PBS2 | — | XRD, TGA, rheology | 3a, 3b |

The following materials were prepared following protocol 3 above:

TABLE 4

PBS/organo-modified LDH materials according to the invention (C6 to C13), and according to the prior art (C'6 to C'10)

| Composite No. | Organo-modified LDH | wt % organo-modified LDH/PBS | Characterization | FIGS. |
|---|---|---|---|---|
| C6 | M1 | 1 | XRD, DSC, TGA, rheology, DMTA | 2 |
| C7 | M1 | 3 | XRD, DSC, TGA, rheology, DMTA | 2 |
| C8 | M1 | 5 | XRD, DSC, TGA, rheology, DMTA | 2 |
| C9 | M1 | 10 | XRD, DSC, TGA, rheology, DMTA | 2 |
| C10 | M2 | 1 | XRD, DSC, TGA, rheology, DMTA | 1 |
| C11 | M2 | 3 | XRD, DSC, TGA, rheology, DMTA | 1 |
| C12 | M2 | 5 | XRD, DSC, TGA, rheology, DMTA | 1 |
| C13 | M2 | 10 | XRD, DSC, TGA, rheology, DMTA | 1 |
| C'6 | M'6 | 3 | XRD, DSC, TGA, rheology, DMTA | 4 |
| C'7 | M'3 | 3 | XRD, DSC, TGA, rheology, DMTA | 4 |
| C'8 | M'4 | 3 | XRD, DSC, TGA, rheology, DMTA | 4 |
| C'9 | M'5 | 3 | XRD, DSC, TGA, rheology, DMTA | 4 |
| C'10 | M'7 | 3 | XRD, DSC, TGA, rheology, DMTA | 4 |

PPS/Organo-Modified LDH Composite:

The following materials were prepared following protocol 2. The control was prepared following protocol 4P

TABLE 5

PPS/organo-modified LDH materials according to the invention (C14 to C16) and control (T3)

| Composite No. | Organo-modified LDH | PPS | wt % organo-modified LDH/PBS | Characterization | FIGS. |
|---|---|---|---|---|---|
| C14 | M1 | PPS | 1 | XRD, DSC, TGA, rheology | 6 |
| C15 | M1 | PPS | 5 | XRD, DSC, TGA, rheology | 6 |
| C16 | M1 | PPS | 10 | XRD, DSC, TGA, rheology | 6 |
| T3 | — | PPS | | XRD, DSC, TGA, rheology | 6 |

PBSA/Organo-Modified LDH Composite:

The following materials were prepared following protocol 2. The control was prepared following protocol 5.

TABLE 6

PBSA/organo-modified LDH materials according to the invention (C17 to C19) and control (T4)

| Composite No. | Organo-modified LDH | PBSA | wt % organo-modified LDH/PPS | Characterization | FIGS. |
|---|---|---|---|---|---|
| C17 | M1 | PBSA | 1 | XRD, DSC, TGA, rheology | 7 |
| C18 | M1 | PBSA | 5 | XRD, DSC, TGA, rheology | 7 |
| C19 | M1 | PBSA | 10 | XRD, DSC, TGA, rheology | 7 |
| T4 | — | PBSA | | XRD, DSC, TGA, rheology | 7 |

III—Results:

FIGS. 1, 2 and 3 illustrate the effect of introducing filler M1 (Mg: HPPA-modified Al) and M2 (Zn: HPPA-modified Al) in variable amounts relative to PBS. The composite is the result from protocols 2 and 3. A very strong effect was found on the elastic and viscous components of the complex viscosity, which is reflected in the Cole-Cole diagram by a large increase in Newtonian viscosity $\eta_0$ (extrapolation of the circular arc on the real-number axis). As this Newtonian viscosity is directly proportional to the molecular weight, this translates into an indisputable "chain extender" effect. Note that for a level of 10%, a threshold of behavior of the "gel" type is reached by the method of preparation in situ, and independently of the nature of M.

An LDH material organo-modified with the dodecylsulfate surfactant serves as reference filler for the counter-examples C'1, C'2 (protocol ex-situ 1&2). The controls T1 and T2 are commercially available PBSs used without filler.

The LDH/SDS fillers M'1 and M'2 are used for comparison and are representative of the LDH fillers known from the prior art.

The mechanical properties (Newtonian viscosity) obtained for a dispersion of 5 wt % of LDH/SDS (comparative examples C'1, C'2) are equivalent to those obtained without filler (control T2) or else far lower (control T1). The Newtonian viscosity $\eta_0$ (extrapolation of the circular arc on the real-number axis) is in fact almost equal to that of T2, showing no effect of the addition of fillers on the viscoelasticity of the chains. For the ex-situ protocol, the dispersion has a slightly plasticizing effect with a decrease in Newtonian viscosity $\eta_0$ relative to the control T1.

Quantitatively:
T1 (control): $\eta_0$=150 Pa·s (at 140° C.),
C'1 (comparative): $\eta_0$=120 Pa·s (at 140° C.)
C3 (according to the invention): $\eta_0$>1000 Pa·s (at 140° C.)

FIGS. 4 and 5 illustrate the effect of introducing HPPA relative to surfactants such as citric acid (CA), sodium succinate (SU), sodium sebacate (SE), sodium adipate (AD) and ricinoleic acid (RA) in the PBS-LDH$_{MgAl}$ material. The composites obtained are the result from protocols 2 and 3. It is found that introduction of HPPA is reflected in the Cole-Cole diagram by a large increase in Newtonian viscosity $\eta_0$ (extrapolation of the circular arc on the real-number axis) relative to the other surfactants.

The examples illustrate aliphatic polyesters such as poly(butylene succinate), poly(propylene)succinate and poly(butylene succinate-co-adipate). FIGS. 6 and 7 present composite materials comprising an LDH$_{MgAl}$ organo-modified with variable amounts of HPPA and a polymer matrix such as poly(propylene)succinate or poly(butylene succinate-co-adipate). A very strong effect is found on the elastic and viscous components of the complex viscosity, which is reflected in the Cole-Cole diagram by a large increase in Newtonian viscosity $\eta_0$ (extrapolation of the circular arc on the real-number axis).

The invention claimed is:

1. An organo-modified layered double hydroxide material corresponding to formula (I):

$$[M_{1-x}M'_x(OH)_2]^{x+}(HO-\phi-Y-X)_x \cdot mH_2O \quad (I)$$

wherein:
X represents a group selected from: —COO⁻ and —SO₃⁻,
Y represents a group selected from: —CH₂—CH₂— and —CH=CH—,
φ represents a phenyl group ortho, meta or para-substituted, on the one hand with the hydroxyl group, and on the other hand with the group —Y—X,
m represents a number in the range from 0 to 2,
M represents Mg,
M' represents Al, and
x represents a number, 0.1≤x≤0.5.

2. The material as claimed in claim 1, wherein X represents —COO⁻.

3. The material as claimed in claim 1, wherein Y represents —CH₂—CH₂—.

4. The material as claimed in claim 1, which corresponds to formula (Ia):

$$[M_{1-x}M'_x(OH)_2]^{x+}(HO-\phi-CH_2-CH_2-COO^-)_x \cdot mH_2O \quad (Ia)$$

wherein φ is para substituted.

5. The material as claimed in claim 1, wherein: 0.2≤x≤0.4.

6. A composite material comprising at least one polymer matrix based on poly(butylene succinate) and/or poly(propylene succinate) and at least one organo-modified layered double hydroxide material corresponding to formula (I) as claimed in claim 1.

7. The composite material as claimed in claim 6, comprising at least one polymer matrix based on poly(butylene succinate).

8. The composite material as claimed in claim 7, wherein the polymer matrix comprises one or more polymers or copolymers selected from: poly(ε-caprolactone), poly(lactic acid), polyhydroxyalkanoate, poly(ethylene terephthalate), poly(butylene terephthalate), poly(ethylene naphthalate), poly(ethylene adipate), poly(ethylene succinate), poly(propylene succinate), polypropylene, polyethylene, their copolymers and the copolymers that they form with poly(butylene succinate) (PBS).

9. The composite material as claimed in claim 7, wherein the polymer matrix consists essentially of poly(butylene succinate).

10. The composite material as claimed in claim 6, wherein the material (I) represents from 0.1 to 10 wt % relative to the total weight of the polymer matrix.

11. The composite material as claimed in claim 6, wherein said material is obtained by a method comprising:
supplying an organo-modified layered double hydroxide material corresponding to formula (I):

$$[M_{1-x}M'_x(OH)_2]^{x+}(HO-\phi-Y-X)_x \cdot mH_2O \quad (I)$$

supplying the polymer matrix,
mixing the material of formula (I) and the polymer matrix at a temperature greater than or equal to the melting point of the polymer matrix,
extruding the mixture.

12. The composite material as claimed in claim 6, wherein said material is obtained by a method comprising:
supplying an organo-modified layered double hydroxide material corresponding to formula (I):

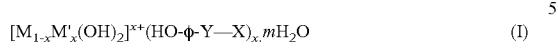

$$[M_{1-x}M'_x(OH)_2]^{x+}(HO\text{-}\phi\text{-}Y\text{---}X)_x.mH_2O \qquad (I)$$

supplying precursors of the polymer matrix,
mixing compound (I) and the precursors of the polymer matrix,
applying conditions to the mixture that allow polymerization of the precursors.

13. A kit for manufacturing the composite material as claimed in claim 6, said kit comprising at least one organo-modified layered double hydroxide material corresponding to formula (I):

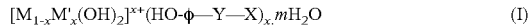

$$[M_{1-x}M'_x(OH)_2]^{x+}(HO\text{-}\phi\text{---}Y\text{---}X)_x.mH_2O \qquad (I)$$

wherein:
X represents a group selected from: —COO⁻ and —SO₃⁻,
Y represents a group selected from: —CH$_2$—CH$_2$— and —CH=CH—,
φ represents a phenyl group ortho, meta or para-substituted, on the one hand with the hydroxyl group, and on the other hand with the group —Y—X,
m represents a number in the range from 0 to 2,
M represents Mg,
M' represents Al, and
x represents a number, 0.1<x<0.5; and
at least a poly(butylene succinate) or a poly(propylene succinate) or a composition of precursors of poly(butylene succinate) or a composition of precursors of poly(propylene succinate).

* * * * *